US012352680B2

(12) United States Patent
Watanabe

(10) Patent No.: US 12,352,680 B2
(45) Date of Patent: Jul. 8, 2025

(54) PARTICLE RECOVERY DEVICE AND PARTICLE RECOVERY METHOD

(71) Applicant: ARKRAY, Inc., Kyoto (JP)

(72) Inventor: Yukio Watanabe, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 399 days.

(21) Appl. No.: 17/812,957

(22) Filed: Jul. 15, 2022

(65) Prior Publication Data

US 2023/0076932 A1 Mar. 9, 2023

(30) Foreign Application Priority Data

Aug. 26, 2021 (JP) ................. 2021-138413

(51) Int. Cl.
*G01N 15/1404* (2024.01)
*G01N 15/10* (2024.01)

(52) U.S. Cl.
CPC . *G01N 15/1404* (2013.01); *G01N 2015/1028* (2024.01); *G01N 2015/142* (2013.01)

(58) Field of Classification Search
CPC ....... G01N 15/1404; G01N 2015/1028; G01N 2015/142; G01N 1/4077; G01N 2001/4094
See application file for complete search history.

(56) References Cited

U.S. PATENT DOCUMENTS

| | | | | |
|---|---|---|---|---|
| 4,983,189 | A * | 1/1991 | Peterson | B01D 43/00 366/127 |
| 2013/0043170 | A1* | 2/2013 | Rose | G01N 33/491 209/659 |
| 2021/0283607 | A1 | 9/2021 | Augustsson et al. | |

FOREIGN PATENT DOCUMENTS

| | | |
|---|---|---|
| EP | 0 773 055 A2 | 5/1997 |
| JP | H10-082723 A | 3/1998 |
| JP | 2012-040647 A | 3/2012 |
| JP | 2020-502539 A | 1/2020 |
| WO | 2018/065626 A1 | 4/2018 |

OTHER PUBLICATIONS

The extended European search report issued by the European Patent Office on Jan. 25, 2023, which corresponds to European Patent Application No. 22191984.8-1001 and is related to U.S. Appl. No. 17/812,957.

(Continued)

*Primary Examiner* — Krishnan S Menon
(74) *Attorney, Agent, or Firm* — Studebaker Brackett PLLC

(57) ABSTRACT

A particle recovery device for recovering particles contained in a liquid sample, the particle recovery device comprising:
  a flow cell having a flow path through which the liquid sample flows;
  standing wave generating means that applies, in the flow path, an ultrasonic wave that sweeps between a second frequency that is a frequency lower than a first frequency that is a frequency of the ultrasonic wave that generates a standing wave having a predetermined number of nodes in the flow path and a third frequency that is a frequency higher than the first frequency; and
  recovery means that recovers the particles focused in the flow path by the standing wave generated by the standing wave generating means.

8 Claims, 12 Drawing Sheets

(56) References Cited

OTHER PUBLICATIONS

Communication pursuant to Article 94(3) EPC issued by the European Patent Office on Dec. 3, 2024, which corresponds to European Patent Application No. 22191984.8-1001 and is related to U.S. Appl. No. 17/812,957.

An Office Action; "Notice of Reasons for Refusal," mailed by the Japanese Patent Office on Jan. 7, 2025, which corresponds to Japanese Patent Application No. 2021-138413 and is related to U.S. Appl. No. 17/812,957; with English language translation.

\* cited by examiner

PARTICLE RECOVERY DEVICE AND PARTICLE RECOVERY METHOD

CROSS-REFERENCE TO RELATED APPLICATION

This application claims priority under 35 USC 119 from Japanese Patent Application No. 2021-138413, filed on Aug. 26, 2021, the disclosure of which is incorporated by reference herein.

BACKGROUND

Technical Field

The present disclosure relates to a particle recovery device and a particle recovery method.

Related Art

A flow path filled with a liquid sample containing particles is irradiated with an ultrasonic wave to form a node of a standing wave in the flow path, and particles focused on the node of the standing wave are recovered.

For example, Japanese Patent Application Laid-Open (JP-A) No. H10-82723 discloses a technique of a fine particle processing device that applies an ultrasonic wave to a flow path through which a solution containing a solvent component and a fine particle component flows to generate a node of a sound pressure of a standing wave at a predetermined position of the flow path, and thus to separate and recover the fine particle component.

For example, Japanese Patent Application Laid-Open (JP-A) No. 2012-40647 discloses a technique of ultrasonic non-contact micromanipulation in which a liquid medium in which a minute object is dispersed is caused to flow in a microchannel, an ultrasonic transducer is attached to one of the sides of a solid cell consisting of a linear flow path and a branched flow path branched into two branches in the midway, and a frequency sweep is performed in which a frequency to be applied to the ultrasonic transducer is continuously and repeatedly changed at the same speed to control a flow direction of the minute object.

In the clinical examination field, for example, a urine sediment test is performed in which the amount and type of tangible components such as red blood cells and white blood cells contained in a liquid sample such as urine are analyzed to examine a health condition of a person who has excreted urine. Since the amount of the tangible component contained in the urine is very small, it is desirable to obtain a concentrated solution in which the concentration of the tangible component in the urine is increased by recovering the tangible component contained in the urine in a small amount of solvent, and to analyze the tangible component contained in the concentrated solution. For example, in order to measure the amount of the tangible component contained in the concentrated solution to determine the amount of the tangible component excreted in the urine and examine the health condition, it is necessary to recover the tangible component contained in the urine at a stable recovery rate.

It is required to recover particles contained in such a liquid sample at a stable recovery rate without variation.

The inventor has found that for example, when an ultrasonic wave of a single frequency is applied in a flow path of a cell filled with a liquid sample such as urine to generate a standing wave having a node in the flow path, and a tangible component focused on the node is recovered into a small amount of liquid to obtain a concentrated solution of the tangible component, the recovery rate of the tangible component varies for each sample of the liquid sample, and the recovery rate between samples of the liquid sample is not stable, so that a concentration rate is not stable. An excretion amount of urine and a component excreted from a body into urine vary depending on situations, such as water intake, sweating, and dietary restriction, and a health condition of a person who excretes urine. Thus, the density and components of a liquid portion of urine vary, and it is considered that this influences. As a result of studying the cause, it has been found that the frequency of the ultrasonic wave required for generating the standing wave in the liquid sample varies depending on the density of the liquid portion of the liquid sample.

SUMMARY

A particle recovery device according to a first aspect of the present disclosure has been made based on the above findings, and the particle recovery device includes: a flow cell having a flow path in which a liquid sample containing particles is stored; standing wave generating means that generates a standing wave having a predetermined number of nodes in the flow path, and gives vibration to the flow path while sweeping between a first frequency, a second frequency lower than the first frequency, and a third frequency higher than the first frequency; and recovery means that recovers the particles focused in the flow path by the standing wave generated by the standing wave generating means.

The particle recovery device according to the first aspect of the present disclosure includes the standing wave generating means that applies the ultrasonic wave having the first frequency and the ultrasonic wave that sweeps between the second frequency lower than the first frequency and the third frequency higher than the first frequency, thereby providing a device that stably recovers the particles contained in the liquid sample having various densities.

In a particle recovery method according to a second aspect of the present disclosure, when a frequency of an ultrasonic wave that generates a standing wave having a predetermined number of nodes in a flow path in which a liquid sample containing particles is stored is a first frequency, the flow path is irradiated with the ultrasonic wave that sweeps between a second frequency lower than the first frequency and a third frequency higher than the first frequency, and the particles focused in the flow path by the standing wave generated by the irradiation with the ultrasonic wave are recovered.

The particle recovery method according to the second aspect of the present disclosure provides a method of stably recovering the particles contained in the liquid sample having various densities and the like by irradiating the flow path with the ultrasonic wave of the first frequency and the ultrasonic wave that sweeps between the second frequency lower than the first frequency and the third frequency higher than the first frequency.

According to the present disclosure, particles contained in a liquid sample having various densities and the like can be recovered well.

BRIEF DESCRIPTION OF THE DRAWINGS

Exemplary embodiments will be described in detail based on the following figures, wherein.

DETAILED DESCRIPTION (Configuration)

Figure 1:
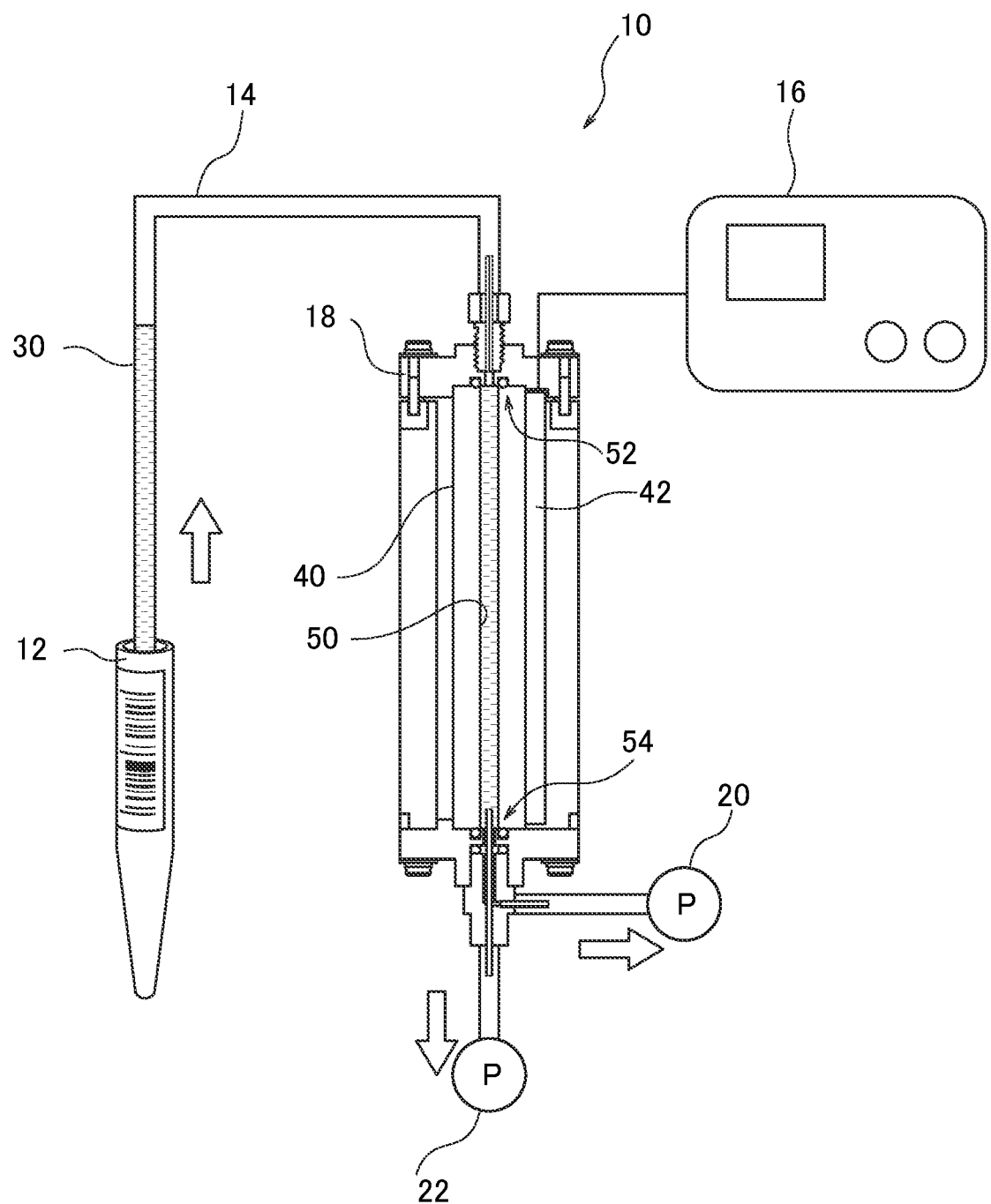
FIG. 1 is a schematic view of a configuration of a particle recovery device according to an exemplary embodiment of the present disclosure.

First, a configuration of a particle recovery device 10 according to an exemplary embodiment of the present disclosure will be described.

As shown in FIGS. 1 to 3 and 4A to 4C, the particle recovery device 10 according to an exemplary embodiment of the present disclosure includes a flow cell 40, a supporting member 18 that supports the flow cell 40, a piezoelectric element 42 provided on a wall surface of the flow cell, an oscillator 16 that oscillates the piezoelectric element, a spitz tube 12 that stores a sample solution 30 (an example of a "particle-containing liquid sample" according to an exemplary embodiment of the present disclosure), an introduction path 14 that causes the sample solution 30 to flow from the spitz tube 12 into the flow cell 40, and a first pump 20 and a second pump 22 that suck the sample solution 30.

As an example, the sample solution 30 is a body fluid, in particular, such as human urine containing particles such as epithelial cells, and the body fluid is recovered from a living body. The sample solution 30 flows into the flow cell 40 from a state of being stored in the spitz tube 12 through the introduction path 14.

Figure 3:
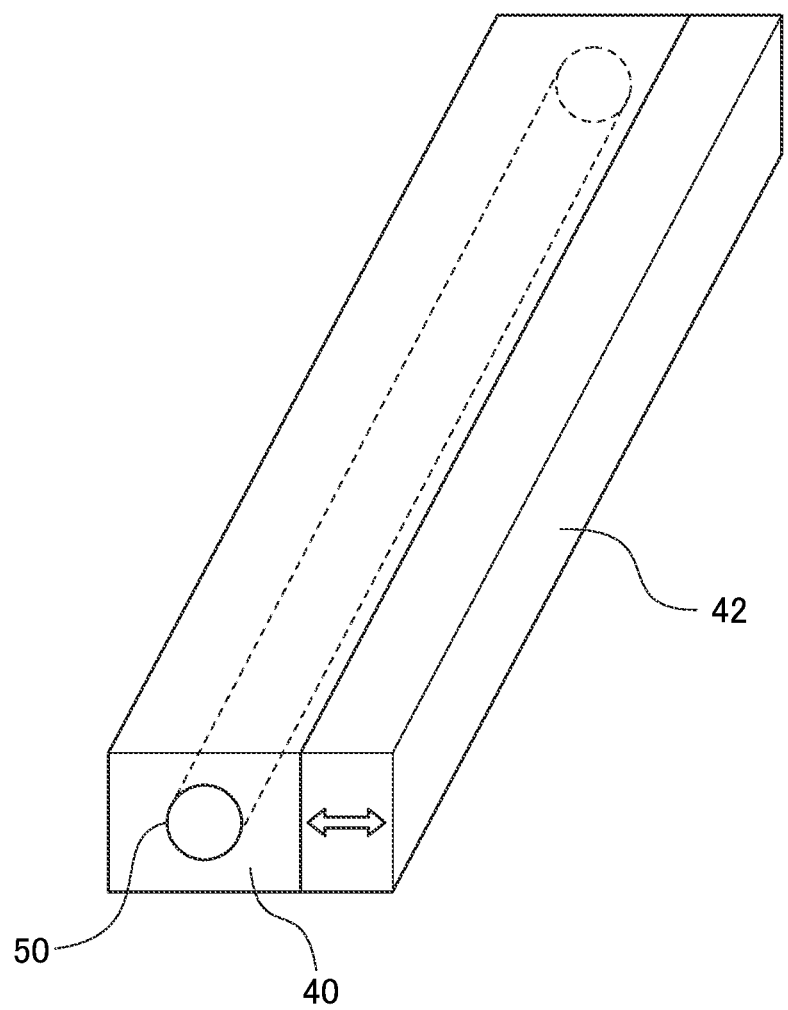
FIG. 3 is a schematic view of a flow cell according to an exemplary embodiment of the present disclosure.

As an example, the flow cell 40 is a substantially rectangular parallelepiped member supported by the supporting member 18, and as shown in FIG. 3, a circular hole-shaped flow path 50 communicating from an upstream side to a downstream side in a longitudinal direction is formed. The piezoelectric element 42 is disposed on the wall surface of the flow cell.

As an example, the flow cell 40 is formed of a hard material such as glass, and is formed by cutting a central portion of a quadrangular prism block into a circular hole shape.

The upstream side of the flow path 50 is a suction port 52 into which the sample solution 30 flows from the introduction path 14 as described above, and the downstream side of the flow path 50 is a discharge port 54 that discharges the sample solution 30. In the present exemplary embodiment, a direction communicating from the suction port 52 to the discharge port 54 of the flow path 50 (direction in which the sample solution flows) is defined as a "flow direction".

Figure 2:
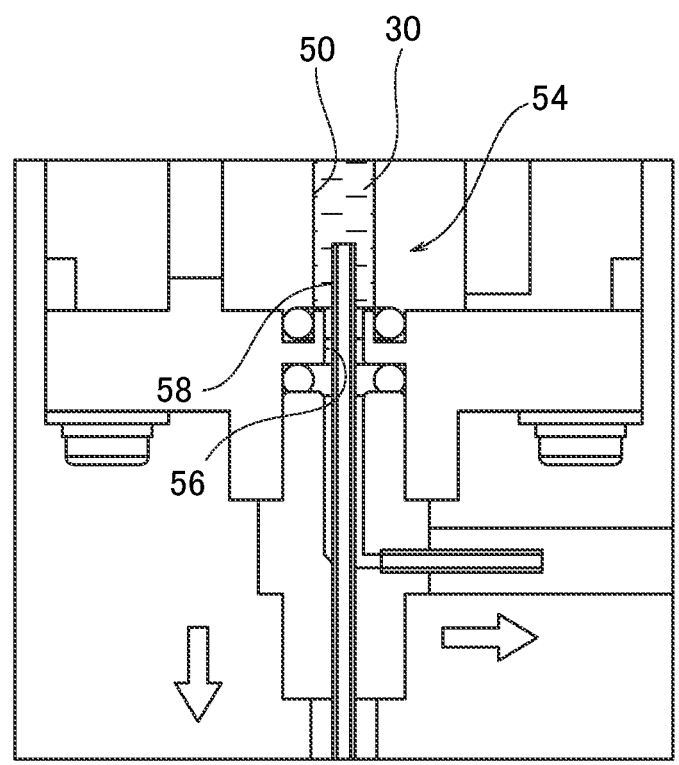
FIG. 2 is an enlarged schematic view showing a discharge port of the particle recovery device according to an exemplary embodiment of the present disclosure.

As shown in FIG. 2, a double tube having an outer tube 56 and an inner tube 58 disposed at a center of the outer tube 56 is connected to the discharge port 54. The inner tube 58 extends from an opening of the outer tube 56 to the outside of the outer tube 56. As an example, the double tube is connected to the discharge port 54 of the flow path 50 such that the inner tube 58 is disposed along a central axis of an inner diameter of the flow path 50.

As shown in FIG. 2, the inner tube 58 is located on the downstream side (downstream side with respect to a portion where a standing wave SW to be described later is generated) of a portion of the flow path 50 with which the piezoelectric element 42 is in contact, on the central axis of the flow path 50, and is opened toward the upstream side.

Here, the outer tube 56 is bent in an L shape and is connected to the first pump 20. The inner tube 58 is connected to the second pump 22. Thus, by driving the first pump 20 and the second pump 22, the sample solution 30 stored in the spitz tube 12 can be sucked to the flow cell 40 and caused to flow into the flow cell 40, and the sample solution 30 in the flow path 50 can be separately discharged to the outside through the outer tube 56 and the inner tube 58.

The particles in the sample solution 30 are discharged to the outside through the inner tube 58 and then recovered. That is, the first pump 20, the second pump 22, the outer tube 56, and the inner tube 58 constitute "recovery means" according to an exemplary embodiment of the present disclosure.

It is desirable that the first pump 20 and the second pump 22 can be driven independently, and the sample solution 30 can be sucked from the spitz tube 12 to the flow cell 40 by driving only the first pump 20.

As shown in FIG. 2, an inner diameter of the outer tube 56 is substantially the same as an inner diameter of the flow path 50, and an inner diameter of the inner tube 58 is equal to or less than about half of the inner diameter of the flow path 50. That is, a cross-sectional area of an inside of the inner tube 58 is equal to or less than about ¼ of a cross-sectional area of an inside of the outer tube 56. When a standing wave having one node is formed in the flow path 50, a diameter of the inner tube 58 is smaller than a wavelength of an ultrasonic wave generated by the piezoelectric element 42.

The piezoelectric element 42 is a member that expands and contracts in a predetermined direction when an alternating-current voltage is supplied, and is provided in a state of being in contact with one side surface of the flow cell 40 along the flow direction of the flow cell 40.

The oscillator 16 supplies the alternating-current voltage to the piezoelectric element 42 of the flow cell 40 described above, thereby expanding and contracting the piezoelectric element 42 in a thickness direction (direction toward an inner wall surface of the flow cell 40). As a result, the ultrasonic wave, which is a compressional wave directed toward the inside of the flow cell 40 from the side surface of the flow cell 40 to which the piezoelectric element 42 is attached, is transmitted to the inner wall surface of the flow cell 40, that is, the inside of the flow path 50. When the generated ultrasonic wave is transmitted to the flow path 50, the sample solution 30 stored in the flow path 50 is irradiated with the ultrasonic wave.

Figure 4:
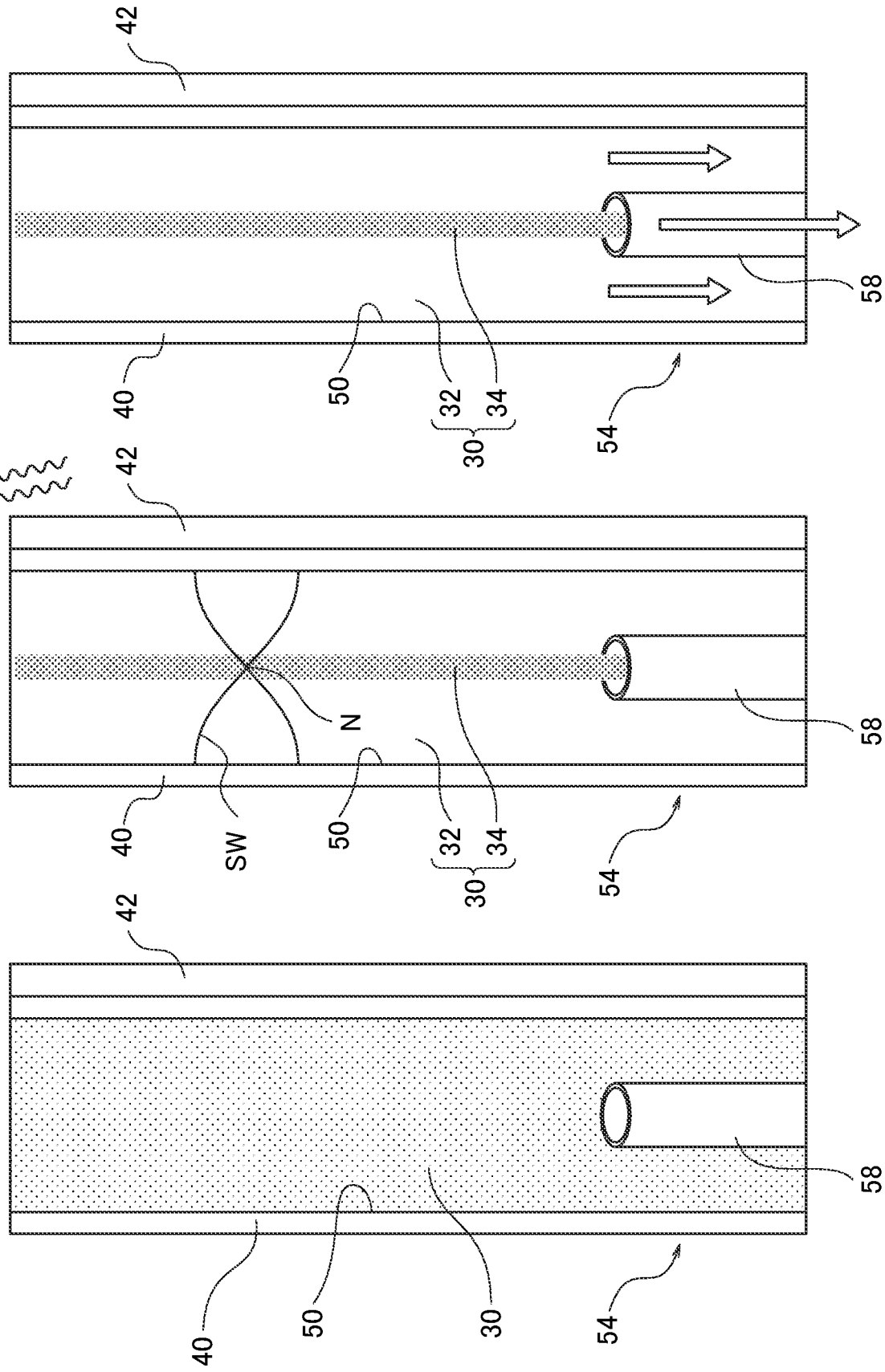
FIGS. 4A to 4C are schematic views of particle recovery by the particle recovery device according to an exemplary embodiment of the present disclosure.

Here, as shown in FIGS. 4A to 4C, in an inner wall surface of the flow path 50, the wall surface on a side on which the piezoelectric element 42 is provided is defined as an inner wall surface A, and the wall surface on an opposite side of the inner wall surface A across the central axis is defined as an inner wall surface B.

As described above, since the ultrasonic wave emitted from the piezoelectric element 42 is transmitted to the flow path 50 through the wall surface of the flow cell 40, the sample solution 30 is irradiated with the ultrasonic wave (ultrasonic wave A) from the inner wall surface A side in the flow path 50. The piezoelectric element 42, the inner wall surface A, and the oscillator 16 correspond to a first ultrasonic irradiation unit that irradiates the sample solution 30 with the ultrasonic wave.

Then, the ultrasonic wave (ultrasonic wave A) transmitted to the sample solution 30 reaches the inner wall surface B side on an opposite side across an axial center of the flow path 50.

At this time, a part of the ultrasonic wave (ultrasonic wave A) having reached the inner wall surface B is not transmitted through the inner wall surface B but reflected by the inner wall surface B. That is, a part of the ultrasonic wave having reached the inner wall surface B travels through the sample solution 30 again toward the inner wall surface A side. That is, the piezoelectric element 42, the inner wall surface B, and the oscillator 16 correspond to a second ultrasonic irradiation unit that irradiates the ultrasonic wave B having the same frequency and amplitude as those of the ultrasonic wave A but having the opposite traveling direction and overlapping with the ultrasonic wave A. The second ultrasonic irradiation unit faces the first ultrasonic irradiation unit.

A part of the ultrasonic wave B having reached the inner wall surface A again is additionally not transmitted through the inner wall surface A and is reflected by the inner wall surface A. That is, a part of the ultrasonic wave having reached the inner wall surface A travels through the sample solution 30 toward the inner wall surface B side again.

Since the piezoelectric element 42 continuously generates the ultrasonic wave (ultrasonic wave A), the inside of the above-described flow path 50 is continuously irradiated with the ultrasonic wave.

At this time, when the wavelengths of the ultrasonic wave A and the ultrasonic wave B satisfy the condition described in the following expression (1), the ultrasonic waves reflected on the inner wall surface A side and the inner wall surface B side overlap and are amplified, so that the standing wave SW is generated in a direction orthogonal to the flow direction inside the flow path 50. L is an inner diameter [m] of the flow path 50, λ, is a wavelength [m] of the ultrasonic wave, and n is an arbitrary integer of 1 or more.

[Math. 1]
$$L = \frac{1}{2}\lambda\, n \tag{1}$$

That is, the oscillator 16, the piezoelectric element 42, the inner wall surface A, and the inner wall surface B are an example of a "standing wave generating means" according to an exemplary embodiment of the present disclosure.

The frequency of the alternating-current voltage supplied from the oscillator 16 is equal to the frequency of the ultrasonic wave emitted from the piezoelectric element 42. That is, the frequency of the ultrasonic wave emitted from the piezoelectric element 42 can be swept by sweeping the frequency of the alternating-current voltage supplied from the oscillator 16 to the piezoelectric element 42.

The frequency of the alternating-current voltage supplied from the oscillator 16 can be changed linearly or stepwise while supplying the alternating-current voltage to the piezoelectric element 42. That is, the frequency of the alternating-current voltage supplied from the oscillator 16 to the piezoelectric element 42 can be swept.

(Generation of Standing Wave and Concentration Principle of Particles)

As shown in FIG. 4A, in a state before the flow path 50 is filled with the sample solution 30 and irradiated with the ultrasonic wave, the particles contained in the sample solution 30 are uniformly dispersed in the sample solution 30.

When the alternating-current voltage is supplied to the piezoelectric element 42 in this state and the ultrasonic wave is emitted from the piezoelectric element 42, the ultrasonic wave is applied into the sample solution 30 in the flow path 50 along the wall surface of the flow cell 40.

Here, when a wavelength λ, of the ultrasonic wave propagating through the sample solution 30 has a length of about ½ with respect to the diameter of the flow path 50, that is, when n=1 in the expression (1) described above, the standing wave SW is generated in the sample solution 30 in a radial direction of the flow path 50 as shown in FIG. 4B. The inner wall surface A and the inner wall surface B are free ends of the standing wave.

In this case, as shown in FIG. 4B, a node N of the standing wave SW is generated on the central axis of the flow path 50, and an antinode AN of the standing wave SW is generated on the inner wall surface of the flow path 50, that is, the inner wall surface A and the inner wall surface B. Then, the particles dispersed between the antinode AN and the node N of the standing wave SW move toward a position of the node N of the standing wave SW. As a result, the particles in the sample solution 30 are focused at the position of the node N of the standing wave SW, and at a portion other than the node N of the standing wave SW, the particles in the sample solution 30 are reduced, that is, the concentration is reduced; therefore, a portion (concentrated solution) 34 where the particles are focused and a portion (low-concentration liquid) 32 where the particles are hardly contained are generated in the sample solution 30. In other words, the density of the particles in the sample solution 30 is biased depending on the position in the flow path 50, the concentration (density) of the particles is high at a position where the node N of the standing wave SW is present, and the concentration (density) of the particles is low at a position other than the position where the node N is present.

Here, even when vibration of the piezoelectric element 42 is stopped from the state shown in FIG. 4B, the particles are not immediately dispersed in the entire sample solution 30 and remain at the position where the node N of the standing wave SW has been present for a while. Thus, a state in which the sample solution 30 is divided into the concentrated solution 34 and the low-concentration liquid 32 is maintained inside the flow cell 40. That is, the concentration (density) of the particles is high at the position where the node N of the standing wave SW has been present, and the concentration (density) of the particles is low at the position other than the position where the node N has been present.

Then, as shown in FIG. 4C, when the first pump 20 and the second pump 22 are each driven in a state where the concentration (density) of the particles of the sample solution 30 at the position where the node N of the standing wave SW is present is high, the particles focused at the position of the node N are discharged to the inner tube 58 provided downstream as the concentrated solution 34, and the low-concentration liquid 32 is discharged to the outer tube 56.

As described above, the piezoelectric element 42 is vibrated so as to generate the standing wave SW in the radial direction of the flow path 50 with respect to the sample solution 30, and the liquid in which the particles are focused is recovered from the inner tube 58, so that the particles can be concentrated.

As shown in FIG. 4C, when the particles are discharged by the first pump 20 and the second pump 22 after the particles in the sample solution 30 are focused, it is preferable to discharge the particles in a state where the flow of the sample solution 30 is a laminar flow inside the flow path 50 in order to prevent the particles from being discharged from the outer tube 56 due to disturbance of the liquid flow. The sample solution 30 may be recovered in a state of being irradiated with the ultrasonic wave.

A discharge amount of the first pump 20 connected to the outer tube 56 is larger than a discharge amount of the second pump 22 connected to the inner tube 58. A ratio of the discharge amounts in the first pump 20 and the second pump 22 according to an exemplary embodiment of the present disclosure is desirably equal to a ratio of a cross-sectional areas of the diameters of the outer tube 56 and the inner tube 58.

(Determination of First Frequency)

The first frequency is set to, for example, the frequency of the ultrasonic wave at which particles contained in a representative sample solution among sample solutions having various densities are recovered well. As the first frequency, a plurality of sample solutions 30 having different densities are provided, the frequency at which the particles contained in the sample solution 30 are efficiently recovered is acquired, and an arbitrary frequency are selected from a range of an upper limit value and a lower limit value of the acquired frequency. The first frequency is preferably an average value of the upper limit value and the lower limit value of the acquired frequency, or a median, an average value, or a mode value of the plurality of acquired frequencies. It is preferable to select a predetermined frequency at which the particles contained in the sample solution 30 are stably recovered when the plurality of sample solutions 30 having different densities are irradiated with the ultrasonic wave. Furthermore, it is preferable that an averaged sample solution obtained by mixing a plurality of sample solutions having different densities is prepared, and the frequency of the ultrasonic wave capable of recovering particles of the averaged sample solution well is the first frequency. A good recovery rate can be obtained in a representative individual of sample solutions having different densities depending on the first frequency thus selected.

An example of acquiring the frequency at which the particles of the plurality of sample solutions 30 having different densities are efficiently recovered in the particle recovery device according to the present exemplary embodiment will be described below as a procedure for determining the first frequency. The ultrasonic wave of the first frequency in this example forms a standing wave having one node in the flow path 50.

Empirically, the density of most urine samples falls within a range of 1.01 g/cm$^3$ or more and 1.05 g/cm$^3$ or less. Thus, Samples 1 to 7 having a density within a range of 1.01 g/cm$^3$ or more and 1.05 g/cm$^3$ or less, were prepared as follows on the assumption of urine samples having various densities.

As the sample solution 30 of Sample 1, human epithelial cells which were tangible components in urine were added as particles to urine prepared by mixing a plurality of urine of healthy persons for averaging. The density of the sample solution 30 of Sample 1 was 1.01 g/cm$^3$.

As the sample solution 30 of Sample 2, glucose was added to Sample 1 to adjust the density to 1.02 g/cm$^3$.

As the sample solution 30 of Sample 3, urea was added to Sample 1 to adjust the density to 1.02 g/cm$^3$.

As the sample solution 30 of Sample 4, albumin was added to Sample 1 to adjust the density to 1.02 g/cm$^3$.

As the sample solution 30 of Sample 5, glucose was added to Sample 1 to adjust the density to 1.05 g/cm$^3$.

As the sample solution 30 of Sample 6, urea was added to Sample 1 to adjust the density to 1.05 g/cm$^3$.

As the sample solution 30 of Sample 7, albumin was added to Sample 1 to adjust the density to 1.05 g/cm$^3$.

Table 1 below summarizes the description of Samples 1 to 7 above.

TABLE 1

| Sample No. | Tangible component | Density (g/cm$^3$) | Type of sample solution |
| --- | --- | --- | --- |
| Sample 1 | Epithelial cell | 1.01 | Urine |
| Sample 2 | Epithelial cell | 1.02 | Urine added with glucose |
| Sample 3 | Epithelial cell | 1.02 | Urine added with urea |
| Sample 4 | Epithelial cell | 1.02 | Urine added with albumin |
| Sample 5 | Epithelial cell | 1.05 | Urine added with glucose |
| Sample 6 | Epithelial cell | 1.05 | Urine added with urea |
| Sample 7 | Epithelial cell | 1.05 | Urine added with albumin |

For the sample solutions 30 of Samples 1 to 7, the concentration of the tangible component contained in the concentrated solution 34 after undergoing the following concentration treatment procedure was compared with the concentration of the tangible component of the sample solution 30 before performing the concentration treatment procedure, and a concentration ratio was calculated. In addition, the recovery rate was determined by multiplying the concentration rate by a ratio of a liquid amount of the recovered concentrated solution 34 to the liquid amount of the recovered sample solution 30. That is, recovery rate can be expressed as:

$(Cb/Vb) \times (Va/Ca) \times (Vb/Va) = Cb/Ca$

Ca: Number of tangible components contained in sample solution

Cb: Number of tangible components contained in concentrated solution

Va: Liquid amount of sample solution

Vb: Liquid amount of concentrated solution

In the present exemplary embodiment, since the liquid amount of the concentrated solution 34 is 20% of the liquid amount of the sample solution 30, it can be said that when the recovery rate exceeds 20%, the standing wave SW is generated, and the concentration is performed.

Figure 5:
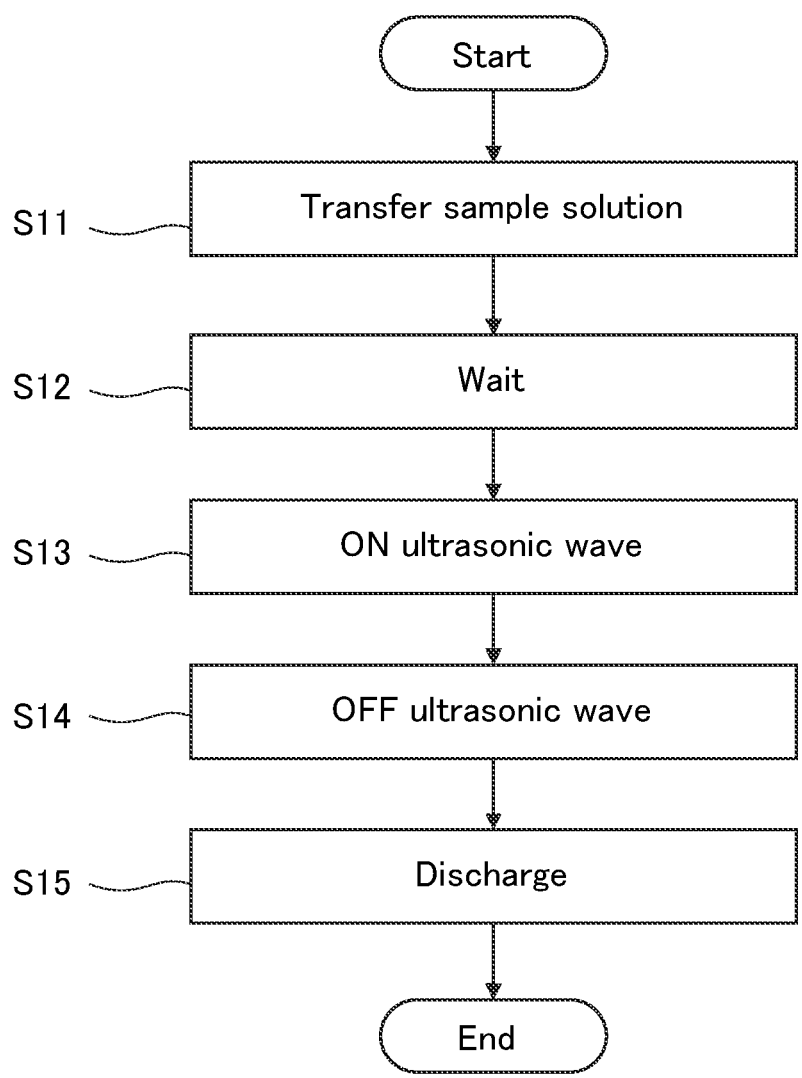
FIG. 5 is a flowchart of a first frequency measurement procedure by the particle recovery device according to an exemplary embodiment of the present disclosure.

FIG. 5 is a flowchart of an operation procedure of the particle recovery device for measuring the frequency of the ultrasonic wave where the standing wave SW is generated.

First, as a first step S11, only the first pump 20 is driven in a state where the second pump 22 is stopped, whereby the sample solution 30 stored in the spitz tube 12 is caused to flow into the flow path 50 in the flow cell 40 and filled.

Next, as a second step S12, after the sample solution 30 is caused to flow into the flow path 50, the first pump 20 is stopped, and waiting is performed for a predetermined time until the flow of the sample solution 30 in the flow path 50 does not flow.

Next, as a third step S13, the piezoelectric element 42 is vibrated by supplying the alternating-current voltage of 60 V constant voltage from the oscillator 16 to the piezoelectric element 42, and the sample solution 30 in the flow path 50 is irradiated with an ultrasonic wave of a constant frequency for 3 seconds, so that the node N is generated on the central axis of the flow path 50 of the flow cell 40.

Next, as a fourth step S14, the supply of the alternating-current voltage from the oscillator 16 to the piezoelectric element 42 is stopped, and the vibration of the piezoelectric element 42 is stopped.

Next, as a fifth step S15, the first pump 20 and the second pump 22 are driven to cause the concentrated solution 34 to flow out to the inner tube 58 and the low-concentration liquid 32 to flow out to the outer tube 56 as shown in FIG. 4C, thereby discharging the sample solution 30 from the flow path 50.

Figure 6A:
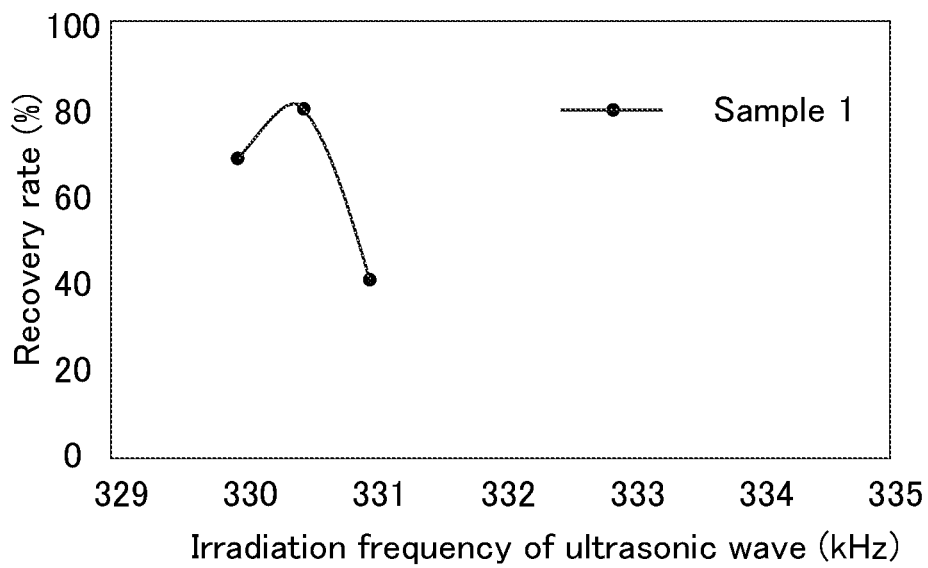
FIGS. 6A to 6C are graphs showing a change in a recovery rate obtained by the first frequency measurement procedure using the particle recovery device according to an exemplary embodiment of the present disclosure.
Figure 6B:
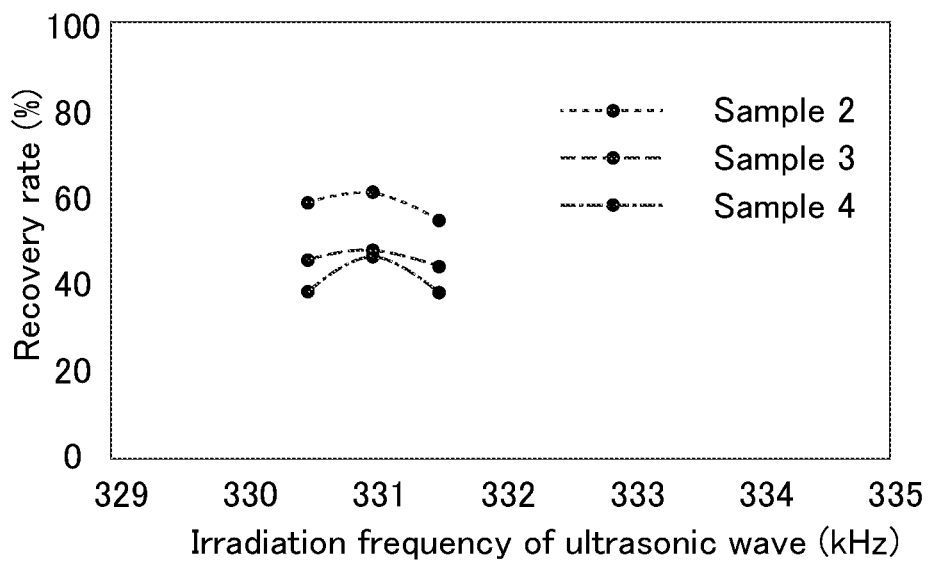
Figure 6C:
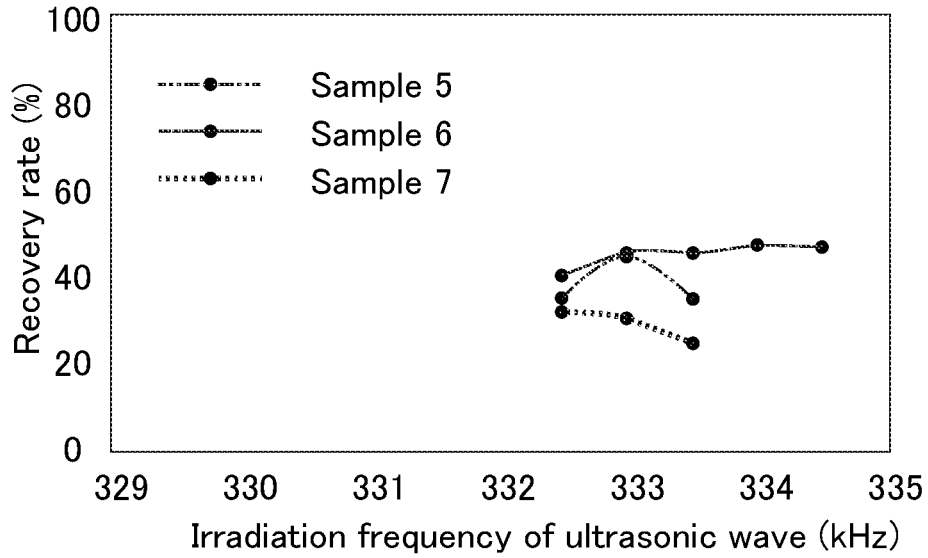

FIGS. 6A to 6C show the results of measuring the recovery rate by performing the concentration treatment described above on the sample solutions 30 of Samples 1 to 7, measuring and comparing the concentration of the tangible component before and after the concentration treatment.

As shown in FIG. 6A, in the sample solution 30 of Sample 1 having a density of 1.01 g/cm³, the recovery rate exceeded 20% at frequencies of 330 kHz, 330.5 kHz, and 331 kHz, and therefore it can be said that the standing wave SW was generated. The recovery rate was most improved when the frequency of the ultrasonic wave to be applied was set to 330.5 kHz. It was estimated that the recovery rate was low when the ultrasonic wave having a frequency of 331 kHz or more was applied. As described above, by irradiating the sample solution 30 of Sample 1 with the ultrasonic wave having a frequency of 330.5 kHz, the particles in the sample solution 30 were efficiently recovered.

Similarly, as shown in FIG. 6B, in the sample solutions 30 of Samples 2, 3, and 4 having a density of 1.02 g/cm³, the recovery rate exceeded 20% at frequencies of 330.5 kHz, 331 kHz, and 331.5 kHz, and therefore it can be said that the standing wave SW was generated. The recovery rate was most improved when the frequency of the ultrasonic wave to be applied was set to 331 kHz. As described above, by irradiating the sample solutions 30 of Samples 2, 3, and 4 with the ultrasonic wave having a frequency of 331 kHz higher than 330.5 kHz at which the highest recovery rate is obtained in Sample 1, the particles in the sample solution 30 were efficiently recovered.

Similarly, as shown in FIG. 6C, in the sample solutions 30 of Samples 5 and 7 having a density of 1.05 g/cm³, the recovery rate exceeded 20% at frequencies of 332.5 kHz, 333 kHz, and 333.5 kHz, and therefore it can be said that the standing wave SW was generated. In the sample solution 30 of Sample 6 having a density of 1.05 g/cm³, the recovery rate exceeded 20% at frequencies of 332.5 kHz or more and 334.5 kHz or less, and therefore it can be said that the standing wave SW was generated. The recovery rate was most improved when the frequency of the ultrasonic wave to be applied was set to 333 kHz in Sample 5, 334 kHz in Sample 6, and 332.5 kHz in Sample 7. As described above, by irradiating the sample solutions of Samples 5, 6, and 7 with the ultrasonic waves respectively having frequencies of 333 kHz, 334 kHz, and 332.5 kHz higher than 331 kHz at which the highest recovery rate was obtained in Samples 2 to 4, the particles in the sample solution 30 were efficiently recovered.

From this test result, it is found that the frequency of the ultrasonic wave capable of efficiently recovering the particles in the sample solution 30 varies depending on the density of the sample. When the sample solution 30 is urine, it has been found that the frequency at which the particles in the sample solution 30 representing urine can be efficiently recovered is in a range of 330.5 kHz or more and 334 kHz or less. Thus, a predetermined frequency of 330.5 kHz or more and 334 kHz or less can be used as the first frequency. It is preferable that 332.25 kHz which is an average value of 330.5 kHz which is a lower limit value and 334 kHz which is an upper limit value is used as the first frequency.

As an example different from the above-described procedure for determining the first frequency, an example in which a predetermined frequency at which the particles contained in the sample solution 30 can be stably recovered when the plurality of sample solutions 30 having different densities are irradiated with the ultrasonic wave is the first frequency will be described.

As the sample solution 30 of Sample 8, human epithelial cells which were tangible components were added as particles to urine prepared by mixing a plurality of urine of healthy persons. The density of the sample solution 30 of Sample 8 was 1.02 g/cm³. As Samples 5, 6, and 7, those described above were used. The contents of the description of Sample 8 are summarized in Table 2.

TABLE 2

| Sample No. | Tangible component | Density (g/cm³) | Type of sample solution |
|---|---|---|---|
| Sample 8 | Epithelial cell | 1.02 | Urine |

The first step S11 and the second step S12 were performed on the sample solutions 30 of Samples 5 to 8. Thereafter, as the third step S13, the piezoelectric element 42 was vibrated by supplying the alternating-current voltage of 60 V constant voltage from the oscillator 16 to the piezoelectric element 42, and the sample solution 30 in the flow path 50 was irradiated with the ultrasonic wave of a predetermined frequency. The inside of the flow cell 40 was observed with a microscope from a side wall side, and an elapsed time (focusing time) required from when the ultrasonic wave was applied until the tangible component was focused at the center of the flow cell 40 was measured. The frequencies of ultrasonic waves were considered to be 330 kHz, 331 kHz, 332 kHz, 333 kHz, and 334 kHz. The frequency indicating a short focusing time indicates the frequency at which the standing wave SW is stably formed in the flow cell 40 and the tangible component is recovered well.

Table 3 shows the measurement results of the focusing time. In condition 3, an average AVE of the focusing time was shorter than that in conditions 1, 2, 4, and 5. In addition, a standard deviation of the focusing time, a coefficient of variation, and a maximum value of the focusing time at the frequency of 332 kHz in the condition 3 showed values lower than those in the conditions 1, 2, 4, and 5. From this, it can be said that the frequency 332 kHz in the condition 3 is the frequency of the ultrasonic wave capable of stably and satisfactorily recovering the particles contained in the sample solutions having various densities, and is the frequency of the ultrasonic wave capable of recovering well the particles contained in the sample solution representing the sample solutions having various densities. When the frequency of 332 kHz in the condition 3 is the first frequency, the particles contained in the sample liquid representing the sample solutions having various densities are recovered well.

TABLE 3

| Condition No. | Frequency (kHz) | Focusing time (s) | | | | Average AVE (s) | Standard deviation SD | Coefficient of variation CV | Maximum value of focusing time (s) |
|---|---|---|---|---|---|---|---|---|---|
| | | Sample 5 | Sample 6 | Sample 7 | Sample 8 | | | | |
| Condition 1 | 330 | 100 | 100 | 100 | 2.8 | 75.7 | 42.1 | 55.6% | 100 |
| Condition 2 | 331 | 30 | 30 | 18.6 | 1.4 | 20.0 | 11.7 | 58.5% | 30 |
| Condition 3 | 332 | 6.6 | 6.7 | 2.4 | 12.1 | 7.0 | 3.4 | 49.5% | 12.1 |
| Condition 4 | 333 | 2.4 | 3.9 | 7.2 | 100 | 28.4 | 41.4 | 145.9% | 100 |
| Condition 5 | 334 | 6.7 | 3.7 | 25.9 | 100 | 34.1 | 39.0 | 114.5% | 100 |

When the frequency of the ultrasonic wave is f [Hz], f can be obtained by the following expression (2). v is a sound velocity [m/s] traveling in the sample solution 30.

[Math. 2]

$$f = \frac{v}{\lambda} \quad (2)$$

Then, by substituting the expression (1) into the expression (2) and deforming the expression, the following expression (3) is obtained.

[Math. 3]

$$n \approx 2f\frac{L}{v} \quad (3)$$

Here, in the expression (3) described above, n can take an arbitrary integer value (n=1, 2, 3, . . . ) as a so-called vibration mode. That is, if the frequency f of the ultrasonic wave is set to a frequency at which n is an integer value, the standing wave SW is generated in the flow path 50.

The number of the nodes N in the standing wave SW is an integer value having the same value as n. For example, when the frequency f of the ultrasonic wave is set such that n is 2, the number of the nodes N of the generated standing wave SW is 2.

As the position where the node N is generated, the node N is generated at a position obtained by equally dividing a distance from the inner wall surface A to the inner wall surface B (radial length of the flow path 50) by n+1. For example, when n=1, the node N is generated at a position of ½ with respect to the length from the inner wall surface A to the inner wall surface B. When n=2, the node N is generated at positions of ⅓ and ⅔ with respect to the length from the inner wall surface A to the inner wall surface B.

The particle recovery device 10 according to an exemplary embodiment of the present disclosure desirably determines, as the first frequency, the frequency at which the number of nodes N of the standing wave SW is 1, that is, the frequency of the ultrasonic wave at which n=1 is obtained in the above-described expression (3).

The number of nodes N of the standing wave SW at the first frequency is defined as a "predetermined number" according to an exemplary embodiment of the present disclosure.

(Setting of Second Frequency and Third Frequency)

Figure 7:
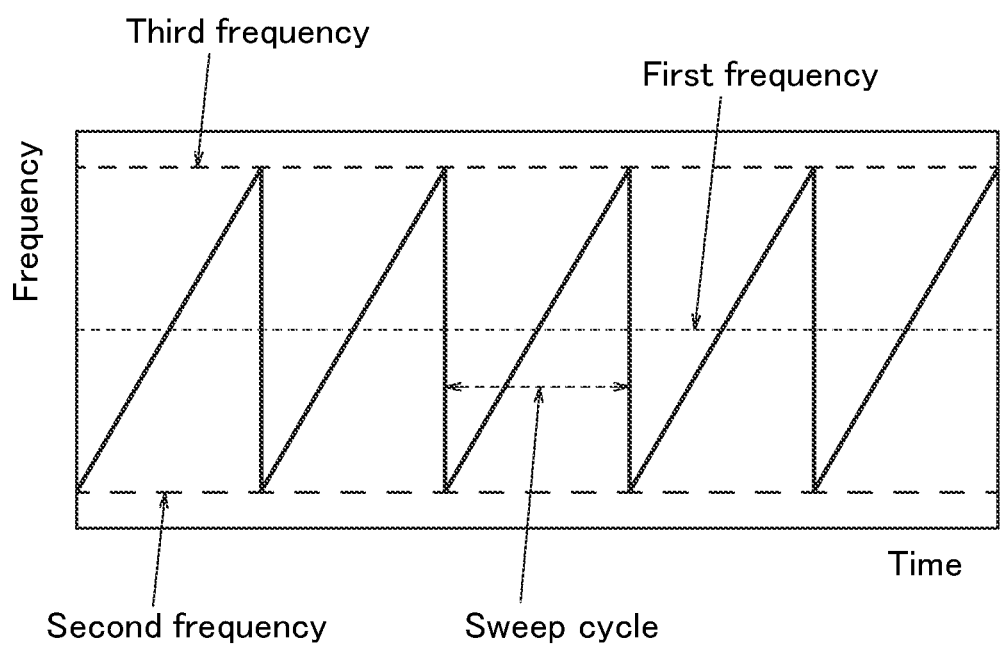
FIG. 7 is a time chart showing a method of sweeping a frequency in the particle recovery device according to an exemplary embodiment of the present disclosure.

The second frequency is lower than the first frequency, and the third frequency is higher than the first frequency. By sweeping the frequencies above and below the first frequency at which the particles contained in the representative sample solution among the sample solutions having various densities are recovered well, it is possible to improve a variation in the recovery rate due to an individual difference of the sample solution. As shown in FIG. 7, the frequency of the piezoelectric element 42 in the particle recovery device 10 according to the present embodiment repeats a sawtooth wave shape, that is, a linear sweep between the frequency lower than the first frequency and the frequency higher than the first frequency.

As shown in FIG. 7, among the frequencies to be swept, the lowest frequency with respect to the first frequency obtained by the above-described measurement with respect to the sample solution 30 is set as the "second frequency" in an exemplary embodiment of the present disclosure, and the highest frequency with respect to the first frequency is set as the "third frequency" in an exemplary embodiment of the present disclosure.

As will be described later, a change width (sweep width) of the frequency is set within 2.5% of the frequency of the first frequency, that is, the second frequency is a frequency that is equal to greater than 97.5% of the frequency of the first frequency, and the third frequency is a frequency that is equal to or less than 102.5% of the frequency of the first frequency. Since the frequency is changed within a range in which the sweep width of the frequency is smaller than the first frequency, the particles having been temporarily focused do not dissipate and remain in a focused position. Even if the frequency is swept and the focusing position changes, due to the small sweep width, the focusing position of the particles falls within a diameter range of the inner tube. In addition, in this case, since a variation range of the frequency of the ultrasonic wave is sufficiently smaller than the first frequency described above, the number of nodes of the standing wave generated in the flow path 50 does not change. That is, when the value of n in the above expression (3) is 1, the value does not change from 1, and the number of nodes N of the standing wave SW generated in the flow path 50 does not change from 1. In other words, the number of nodes N of the standing wave formed by irradiating the flow path 50 with the ultrasonic wave sweeping the frequency is constant.

Therefore, the position of the node N of the standing wave SW in the particle recovery device 10 according to the present exemplary embodiment is only on the central axis of the flow path 50 as in the state shown in FIG. 4B, and the focused particles can be recovered through one inner tube 58.

(Procedure of Particle Concentration Treatment)

Subsequently, a particle concentration method according to an exemplary embodiment of the present disclosure will be described with appropriate reference to FIG. 8.

Figure 8:
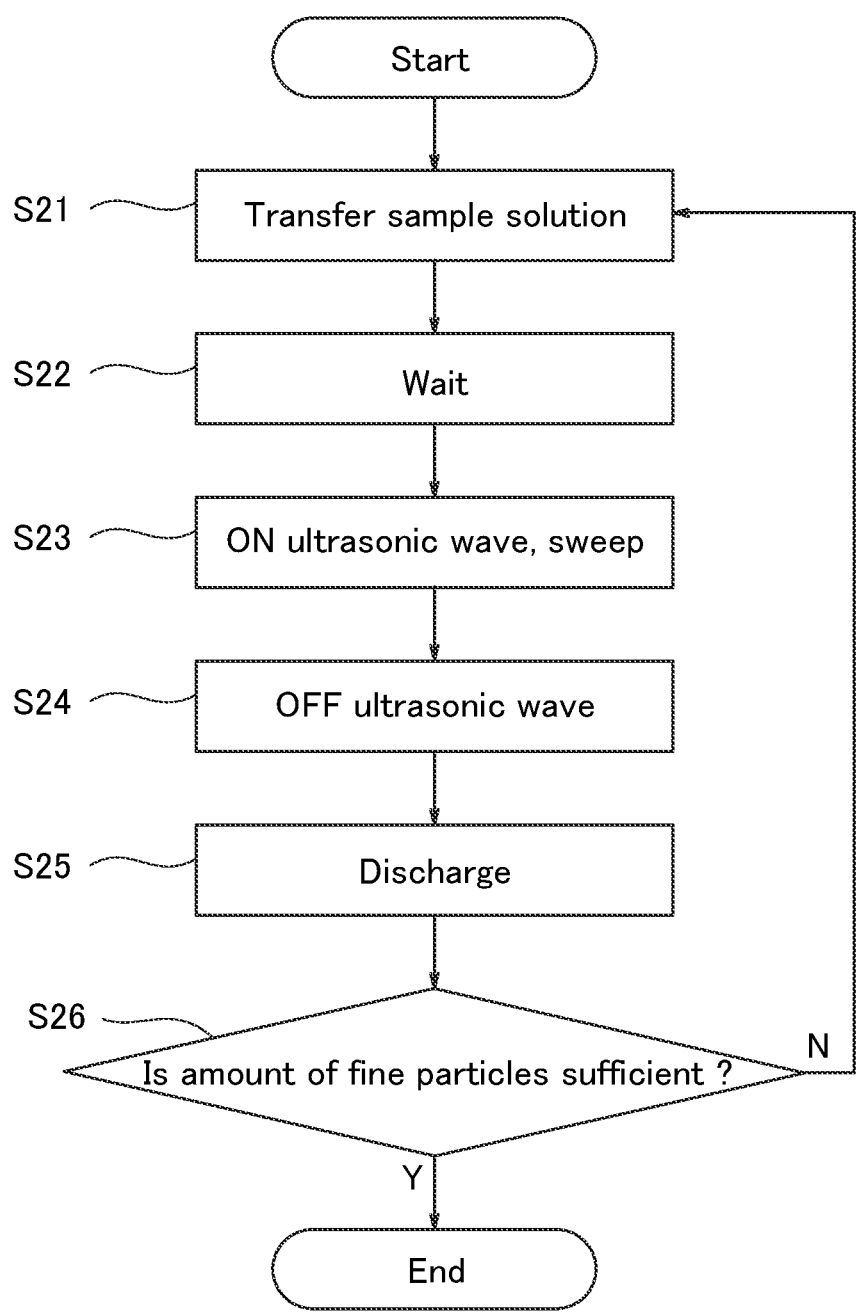
FIG. 8 is a flowchart of a particle recovery procedure by the particle recovery device according to an exemplary embodiment of the present disclosure.

FIG. 8 is a flowchart of a particle concentration method procedure according to an exemplary embodiment of the present disclosure, and a procedure of particle concentration treatment will be described with reference to FIG. 8.

First, a first step S21 is performed. Since S21 is the same as S11, the description thereof will be omitted.

Next, a second step S22 is performed. Since S22 is the same as S12, the description thereof will be omitted.

Next, as a third step S23, the piezoelectric element 42 is vibrated by supplying the alternating-current voltage from the oscillator 16 to the piezoelectric element 42, and the frequency of the ultrasonic wave is swept. For example, the sample solution 30 in the flow path 50 is irradiated with the ultrasonic wave of the first frequency, and thereafter, the second frequency, the third frequency, and the first frequency are swept as one cycle from the first frequency to generate the standing wave having the node N on the central axis of the flow path 50. The frequency may be swept not only in one cycle but also in a plurality of cycles in succession.

Next, a fourth step S24 is performed. Since S24 is the same as S14, the description thereof will be omitted.

Next, a fifth step S25 is performed. Since S25 is the same as S15, the description thereof will be omitted.

Next, as a sixth step S26, an amount of the concentrated solution discharged to the inner tube 58 is measured, and it is confirmed whether the amount of the concentrated solution suitable for the intended use has been obtained. At this time point, when a sufficient amount of the concentrated solution has not been obtained, the process returns to the first step S21, and when a sufficient amount of the concentrated solution has been obtained, the concentration procedure is terminated.

(Operation and Advantageous Effects)

By performing the particle concentration treatment by the above-described procedure, the following operations and effects are obtained.

First, according to the particle recovery device 10 according to an exemplary embodiment of the present disclosure, by linearly sweeping the frequency of the alternating-current voltage supplied to the piezoelectric element 42 between the second frequency and the third frequency, the sample solution 30 is irradiated with the ultrasonic wave at the frequency within a range on the low frequency side and the high frequency side with respect to the first frequency.

At this time, as described above, when the piezoelectric element 42 irradiates the sample solution 30 at a frequency that generates the standing wave SW, the particles dispersed in the sample solution 30 are focused at the position of the node N of the standing wave SW.

When the plurality of sample solutions 30 are provided and liquid properties such as the density and viscosity of the sample solution 30 are different among the plurality of sample solutions 30, the frequency of the ultrasonic wave at which the particles in the sample solution 30 are efficiently recovered is different for each of the sample solutions 30. Thus, when the ultrasonic wave is applied at a constant frequency, the particles do not focus in the flow path 50 depending on the sample, and the recovery rate decreases. As a result, the particles contained in the liquid sample having various densities and the like cannot be stably recovered.

However, in the particle recovery device 10 according to an exemplary embodiment of the present disclosure, for the plurality of sample solutions 30, even when the frequency at which the particles in the sample solutions 30 are efficiently recovered is slightly different for each of the sample solutions 30, the frequency of the alternating-current voltage applied to the piezoelectric element 42 is swept, so that the ultrasonic wave is irradiated at any timing during sweep at the frequency at which the particles in the sample solution 30 are efficiently recovered.

Therefore, even when the particles of the plurality of sample solutions 30 are measured by a series of operations, it is possible to concentrate the particles by the same processing procedure without preparing a procedure for measuring liquid properties and a measuring instrument for each sample, and it is possible to improve operation efficiency, reduce device cost, and stabilize the recovery rate of the tangible component (improve variation in recovery rate due to individual difference of the sample solution 30).

As described above, by linearly sweeping the frequency of the alternating-current voltage supplied to the piezoelectric element 42 between the second frequency and the third frequency, irradiation duration of each vibration having each frequency between the second frequency and the third frequency to the sample solution 30 is uniform.

Therefore, since the frequency of the ultrasonic wave applied into the sample solution 30 is not biased to a specific frequency between the second frequency and the third frequency, the particles can be efficiently concentrated.

As described above, since the number of the nodes N of the standing wave SW at the first frequency is 1, the particles are concentrated at the radial center of the flow path 50, which is the position of the node N.

Here, a double tube including the outer tube 56 and the inner tube 58 disposed inside the outer tube 56 along the central axis of the outer tube 56 is connected to the discharge port 54 of the particle recovery device 10 according to an exemplary embodiment of the present disclosure, the outer tube 56 is disposed coaxially with the flow path 50, and the inner tube 58 is disposed on the central axis of the flow path 50.

Therefore, in the sample solution 30 filled in the flow path 50, while the concentrated solution 34 easily flows to the inner tube 58, the low-concentration liquid 32 easily flows to the outer tube 56, and the concentration efficiency of the particles can be improved. At the same time, when the number of nodes N is 1, the antinode AN of the standing wave SW is not generated at the position of the node N, and the dispersion of the tangible component temporarily focused at the position of the node N can be prevented.

As described above, in the particle recovery device 10 according to an exemplary embodiment of the present disclosure, the flow of the sample solution 30 stops in the flow path 50 after the sample solution 30 flows into the flow path 50, and the ultrasonic wave is applied to the sample solution 30 in a stored state, so that the sample solution 30 is suppressed from flowing inside the flow path 50.

Therefore, when the sample solution 30 is discharged from the flow path 50, the flow of the sample solution 30 can be brought into a laminar flow state so that the concentrated solution 34 easily flows to the inner tube 58 and the low-concentration liquid 32 easily flows to the outer tube 56. As a result, the concentration efficiency of the particles can be improved.

(Modification)

In the above description, as an example of a method of sweeping the frequency of the alternating-current voltage supplied to the piezoelectric element 42, the frequency is changed by sweep from the second frequency side, which is the low frequency side, to the third frequency side, which is the high frequency side, in a sawtooth wave shape. However, the sweeping method in an exemplary embodiment of the present disclosure is not limited thereto. For example, a reverse sawtooth wave shape may be employed in which sweep is performed linearly or stepwise from the third frequency which is the high frequency side to the second frequency which is the low frequency side.

Figure 9:
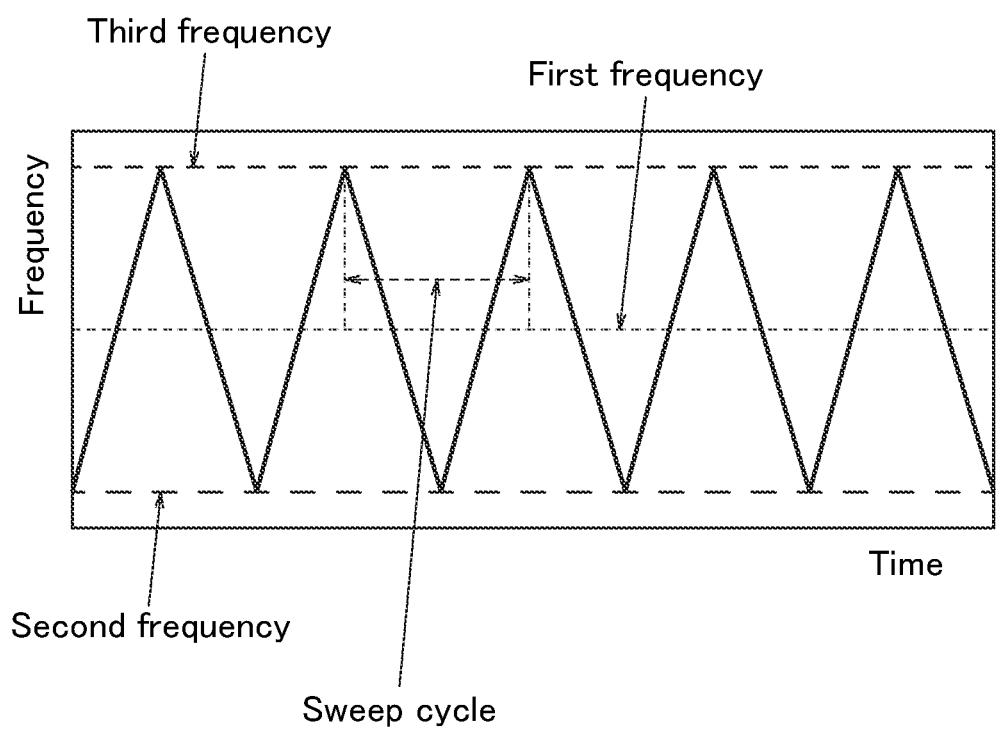
FIG. 9 is a time chart showing a modification of the method of sweeping the frequency in the particle recovery device according to an exemplary embodiment of the present disclosure.
Figure 10A:
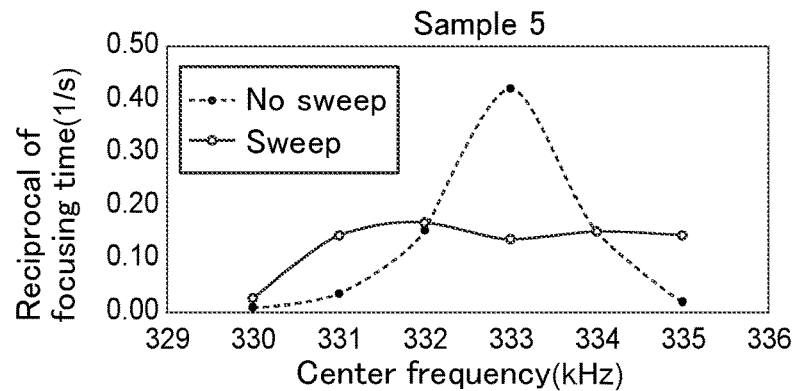
FIGS. 10A to 10D are graphs showing a change in reciprocal of a focusing time of Examples and Comparative Examples using the particle recovery device according to an exemplary embodiment of the present disclosure.
Figure 10B:
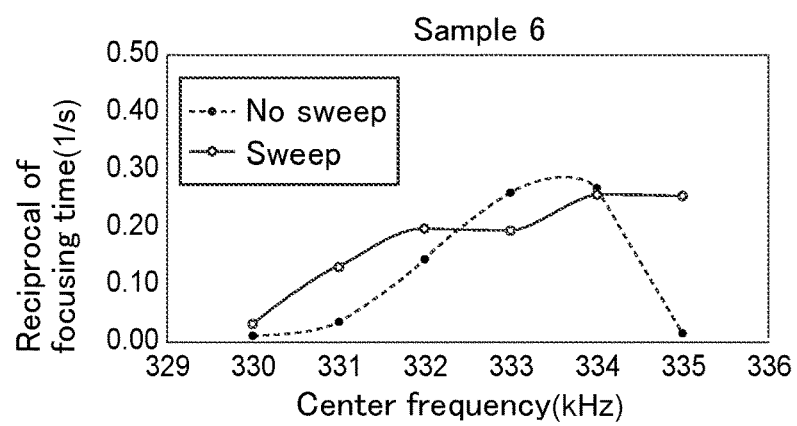
Figure 10C:
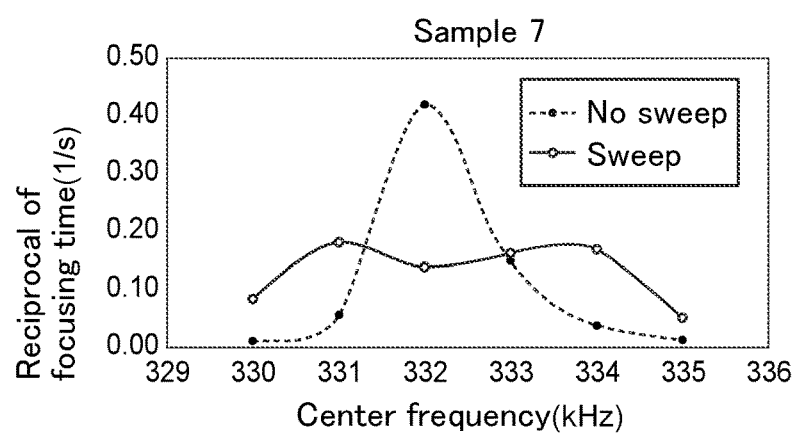
Figure 10D:
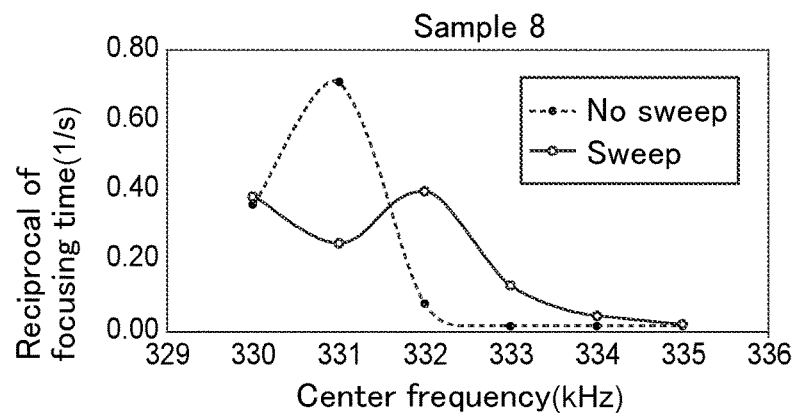

FIG. 9 shows a modification of the method of sweeping the frequency of the alternating-current voltage supplied to the piezoelectric element 42 according to an exemplary embodiment of the present disclosure. As the method of sweeping the frequency of the alternating-current voltage supplied to the piezoelectric element 42 according to an exemplary embodiment of the present disclosure, sweep may be performed in a triangular waveform as shown in FIG. 9. If a gap of a change in frequency is small, it is possible to obtain the same effect as the linear sweep even if the sweep is performed stepwise.

By further providing pressurizing means, such as a liquid feeding pump, in the middle of the introduction path 14, the sample solution 30 in the flow path 50 may be pressurized in a state where the inflow of the sample solution 30 into the flow path 50 is completed.

In this case, since the sample solution 30 in the flow path 50 is pressurized by the pressurizing means during the irradiation with the ultrasonic wave in the third step S23, it is possible to prevent cavitation from occurring in the sample solution 30 filled in the flow path 50. When a high voltage is applied to the piezoelectric element 42 and the piezoelectric element is irradiated with the ultrasonic wave, cavitation occurs, and particle focusing is inhibited. However, by irradiating the sample solution 30 in a pressurized state with the ultrasonic wave, the particles are easily focused, recovery efficiency can be improved, and breakage of the particles can be prevented.

Although the sweep is performed from the second frequency which is the low frequency side with respect to the first frequency to the third frequency which is the high frequency side with respect to the first frequency, the sweeping method in an exemplary embodiment of the present disclosure is not limited thereto. As described above, it is sufficient that oscillation is performed while changing at the frequency between the second frequency and the third frequency, it is preferable that the oscillation is performed uniformly in terms of time or intensity.

Therefore, the piezoelectric element 42 may be oscillated at random between the second frequency and the third frequency.

In the present exemplary embodiment, the piezoelectric element 42 is provided only on one side with respect to the flow direction of the flow cell 40; however, the present invention is not limited thereto. For example, the second piezoelectric element may be provided on the side opposite to the piezoelectric element 42 with respect to the flow direction of the flow cell 40. In this case, the ultrasonic wave generated from the second piezoelectric element and applied into the flow path 50 is an ultrasonic wave having a frequency and amplitude equal to those of the ultrasonic wave generated from the piezoelectric element 42 and applied into the flow path 50, and having a phase equal to that of the ultrasonic wave on the central axis of the flow path 50.

In the particle recovery device 10 described above, the diameter of the inner tube 58 is about half of that of the outer tube 56; however, an exemplary embodiment of the present disclosure is not limited thereto. For example, the recovery rate of the particles in the sample solution 30 may be appropriately set by variously preparing the ratio between the diameter of the inner tube 58 and the diameter of the outer tube 56.

Although the ratio of the discharge amount of the sample solution 30 according to the first pump 20 and the second pump 22 is equivalent to the ratio of the cross-sectional area of the inner tube 58 and the cross-sectional area of the outer tube 56, the ratio of the discharge amount of the sample solution 30 according to the first pump 20 and the second pump 22 in the particle recovery device 10 according to an exemplary embodiment of the present disclosure is not limited thereto. For example, the recovery rate of the particles in the sample solution 30 may be appropriately set by variously changing the ratio of the discharge amount of the sample solution 30 according to the first pump 20 and the second pump 22.

In the particle recovery device 10 described above, the predetermined number (the number of the nodes N obtained by the standing wave SW) is 1; however, the standing wave SW that can be taken by the particle recovery device 10 according to an exemplary embodiment of the present disclosure is not limited thereto. For example, as shown in the above-described expression (3), the frequency of the ultrasonic wave may be set such that n is an integer of 2 or more, and the number of the nodes N obtained by the standing wave SW is 2 or more (so-called high-order mode) to generate the standing wave SW. In this case, since the node N is also generated at a position deviated from the radial center of the flow path 50, the diameter of the inner tube 58 may be changed so as to correspond to the position of the node N. Instead of the double tube, the discharge port 54 may be a multiple tube in which a larger number of tubes are connected coaxially, and the inner tube 58 may be disposed at each position corresponding to the position where the node is generated.

Although the particle recovery device 10 according to an exemplary embodiment of the present disclosure can concentrate the particles in the sample solution 30, depending on the density, physical properties, and the like of the sample solution 30 and the particles, the particles may be concentrated not at the position of the node N but at the position of the antinode in the standing wave generated by the vibration of the piezoelectric element 42. In this case, the relationship among the first pump 20, the second pump 22, the outer tube 56, and the inner tube 58 described above may be reversed. That is, the particles can be concentrated when the inner tube 58 side is the low-concentration liquid 32 and the outer tube 56 side is the concentrated solution 34.

In the above description, the flow cell 40 has a substantially rectangular parallelepiped shape as an example; however, an exemplary embodiment of the present disclosure is not limited thereto. For example, the flow cell 40 may have a cylindrical shape or a regular polygonal columnar shape.

In the above description, the flow path 50 has a circular hole shape; however, an exemplary embodiment of the present disclosure is not limited thereto. For example, the flow path 50 may have a polygonal hole shape.

EXAMPLE

Next, the following various experiments were performed, and the effects of an exemplary embodiment of the present disclosure were verified. In the flow cell 40 used in the experiment, the longitudinal direction was 100 mm, a long side in the lateral direction (radial direction) was 16.9 mm, a short side in the lateral direction was 10 mm, and the diameter of the flow path 50 was 2.6 mm. The piezoelectric element 42 was disposed on one surface along the longitudinal direction on the short side in the short direction of the flow cell 40. It is noted that the first frequency in following Experiment 1-5 has been determined as 332 kHz by performing experiment as mentioned above.

(Experiment 1)

Using the sample solutions 30 of Samples 5 to 8, the effect of improving the variation in the recovery rate due to individual differences of urine was confirmed by the particle recovery method according to an exemplary embodiment of the present disclosure.

As Example 1, the first step S21 and the second step S22 were performed using the sample solutions 30 of Samples 5 to 7 and the sample solution 30 of Sample 8. Thereafter, as the third step S23, the piezoelectric element 42 was vibrated by supplying the alternating-current voltage of 60 V constant voltage from the oscillator 16 to the piezoelectric element 42 and sweeping the frequency of the alternating-current voltage. In the ultrasonic irradiation of the sample solution 30 in the flow path 50, the sweep was performed from a center frequency of 332 kHz, which was the frequency as a center of the sweep, to 334 kHz which was the third frequency, then the sweep was performed through the first frequency to 330 kHz which was the second frequency, and a loop sweep returning to the center frequency was repeated in one cycle of 100 milliseconds. In other words, the ultrasonic wave that sweeps in a range of the sweep width from a center frequency of 332 kHz to upper and lower 2 kHz at 100 milliseconds/cycle was repeatedly irradiated.

Then, the inside of the flow cell was observed with a microscope, and the elapsed time (focusing time) required from when the ultrasonic wave was applied until the tangible component was focused at the center of the flow cell was measured. The frequency at which the time required for focusing is short indicates that the standing wave is stably formed in the flow cell and the tangible component is recovered well, and a small variation in the focusing time (standard deviation, coefficient of variation) indicates that a variation in a recovery amount of the tangible component due to the individual difference of the sample solution 30 is small.

Table 4 shows results of comparison between Example 1 in which the frequency is swept and Comparative Example 1 in which the frequency is not swept. A coefficient of variation CV of the focusing time in Example 1 was 33.9% lower than 49.5% as the coefficient of variation CV of the focusing time in Comparative Example 1. The average AVE of the focusing time in Example 1 was 5.2 seconds shorter than 7.0 seconds as the average AVE of the focusing time in Comparative Example 1. From this result, it has been found that by applying the ultrasonic wave sweeping the range from the second frequency to the third frequency, the variation in the recovery rate of the tangible component due to individual difference of a urine sample is improved, and the tangible component is recovered at a stable recovery rate.

TABLE 4

| | Center frequency (kHz) | Sweep | Sweep width (kHz) (range) | Focusing time (s) | | | | Average AVE (s) | Standard deviation SD | Coefficient of variation CV | Maximum value of focusing time (s) |
| --- | --- | --- | --- | --- | --- | --- | --- | --- | --- | --- | --- |
| | | | | Sample 5 | Sample 6 | Sample 7 | Sample 8 | | | | |
| Example 1 | 332 | Sweep | ±2 (330-334) | 6.1 | 5 | 7.3 | 2.5 | 5.2 | 1.8 | 33.90% | 7.3 |
| Comparative Example 1 | 332 | No sweep | None | 6.6 | 6.7 | 2.4 | 12.1 | 7 | 3.4 | 49.50% | 12.1 |

(Experiment 2)

Using Samples 5 to 7, a relationship between the sweep range of the frequency of the ultrasonic wave and the variation in the recovery rate of the tangible component was verified. Example 2, Example 3, Comparative Example 2, and Comparative Example 3 were performed in the same manner as in Example 1 except that the center frequency was changed.

Table 5 shows results of comparison between Example 1, Example 2, Example 3, Comparative Example 2, and Comparative Example 3 in which the frequency is swept and Comparative Example 1 in which the frequency is not swept. As in Example 1, the coefficients of variation CV of the focusing times of Example 2 and Example 3, which were irradiated with the ultrasonic wave sweeping the upper and lower frequencies of the first frequency, were 24.0% and 15.8% lower than 49.5% as the coefficient of variation CV of the focusing time of Comparative Example 1. The averages AVE of the focusing times in Example 2 and Example 3 were 6.1 seconds and 6.7 seconds which were shorter than 7.0 seconds as the average AVE of the focusing time in Comparative Example 1. On the other hand, the coefficient of variation CV of the focusing time in Comparative Example 2 in which the third frequency higher than the first frequency was not irradiated and Comparative Example 3 in which the second frequency lower than the first frequency was not irradiated was higher than that in Comparative Example 1. From this result, it has been found that by applying the ultrasonic wave sweeping from the second frequency to the third frequency across the first frequency, the variation in the recovery rate of the tangible component due to the individual difference of a urine sample is improved, and the tangible component is recovered at a stable recovery rate.

TABLE 5

| | Center frequency (kHz) | Sweep | Sweep width (kHz) (range) | Focusing time (s) Sample 5 | Sample 6 | Sample 7 | Sample 8 | Average AVE (s) | Standard deviation SD | Coefficient of variation CV | Maximum value of focusing time (s) |
|---|---|---|---|---|---|---|---|---|---|---|---|
| Example 1 | 332 | Sweep | ±2 (330-334) | 6.1 | 5 | 7.3 | 2.5 | 5.2 | 1.8 | 33.9% | 7.3 |
| Example 2 | 331 | Sweep | ±2 (329-333) | 4 | 6.9 | 7.9 | 5.6 | 6.1 | 1.5 | 24.0% | 7.9 |
| Example 3 | 333 | Sweep | ±2 (331-335) | 7.7 | 7.4 | 5 | 6.5 | 6.7 | 1.1 | 15.8% | 7.7 |
| Comparative Example 2 | 330 | Sweep | ±2 (328-332) | 2.6 | 35 | 30 | 12.4 | 20.0 | 13.1 | 65.5% | 35 |
| Comparative Example 3 | 334 | Sweep | ±2 (332-336) | 24 | 6.6 | 3.9 | 6.1 | 10.2 | 8.1 | 79.4% | 24 |
| Comparative Example 1 | 332 | No sweep | None | 6.6 | 6.7 | 2.4 | 12.1 | 7.0 | 3.4 | 49.50% | 12.1 |

(Experiment 3)

The sample solutions 30 of samples 5, 6, 7, and 8 used for determining the first frequency to be 332 kHz were swept while being irradiated with the ultrasonic wave, thereby comparing the effects by the sweep. In Experiment 3, 332 kHz which was the first frequency was used as the center frequency, the ultrasonic wave was swept in a sawtooth wave shape and applied from 330 kHz (corresponding to the "second frequency" shown in FIG. 7) which was the frequency lower by 2 kHz than the center frequency, to 334 kHz (corresponding to the "third frequency" shown in FIG. 7) which was the frequency higher by 2 kHz than the center frequency.

The ultrasonic wave was applied while sweeping in a range of ±2 kHz from the center frequency. The center frequency was selected at intervals of 1 kHz in a range of 330 kHz or more and 335 kHz or less. Here, in this experiment, a cycle of the sweep (period starting from the center frequency and returning to the center frequency through the second frequency and the third frequency) was 100 milliseconds, the sweep was repeatedly performed, and the time required for the particles to be focused was measured.

In addition, for the sample solutions 30 of the same Samples 5, 6, 7, and 8 subjected to the sweep, oscillation was continued at the center frequency without performing the sweep.

Here, the measurement method indicates the reciprocal of the time (focusing time) taken from the start of applying vibration to the flow cell 40 until the tangible component (human epithelial cell) contained in the sample solution 30 filled in the flow path 50 condenses at the center inside the flow path 50. That is, it can be said that as the reciprocal of the focusing time is larger, concentration is performed in a shorter time, and therefore efficiency is higher.

FIGS. 10A to 10D are views showing a result in the case where the sweep is performed and a result in the case where the sweep is not performed, which are obtained by the above-described experimental method.

As shown in FIGS. 10A to 10D, when the sweep is not performed, the reciprocal of the focusing time increases only when the center frequency is set to a specific frequency, and the reciprocal of the focusing time decreases when the center frequency is set to other frequencies. That is, the frequency at which the focusing time was the shortest under the condition where the sweep was not performed was 333 kHz in Sample 5, 334 kHz in Sample 6, 332 kHz in Sample 7, and 331 kHz in Sample 8.

However, in the condition where the sweep is performed, even in a state where the low frequency side and the high frequency side from the frequency at which the focusing time is shortest under the condition where each sweep is not performed are set as the center frequency, the change in the reciprocal of the focusing time is smaller than that under the condition where the sweep is not performed. That is, when the center frequency in the condition where the sweep is performed is in the range between 331 kHz and 335 kHz for Sample 5, in the range between 331 kHz and 335 kHz for Sample 6, in the range between 331 kHz and 334 kHz for Sample 7, and in the range between 330 kHz and 333 kHz for Sample 8, the change in the reciprocal of the focusing time is small with respect to the condition where the sweep is not performed.

As described above, when the sweep is performed, the frequency of the alternating-current voltage applied to the piezoelectric element 42 is swept, so that the ultrasonic wave having the frequency at which the focusing time is the shortest is applied at any timing during the sweep. Therefore, it can be seen that the change in the reciprocal of the focusing time is suppressed.

From this, when the sweep is performed, as shown in FIGS. 10A to 10D, in a range where the change in the reciprocal of the focusing time is small, the "first frequency" (frequency at which the particles in the sample solution 30 can be efficiently recovered) in the present exemplary embodiment can be set, the frequency lower than the first frequency can be set as the second frequency, and the frequency higher than the first frequency can be set as the third frequency. Then, the first frequency can be set to 332 kHz for the sample solutions 30 of Samples 5, 6, 7, and 8, 330 kHz lower by 2 kHz than the first frequency can be set to the second frequency, and 334 kHz higher by 2 kHz than the first frequency can be set to the third frequency.

As described above, by setting the first frequency to 332 kHz, the particles can be concentrated by the same treatment procedure without changing the treatment procedure for each of the sample solutions 30 of Examples 1 to 4, and the operation efficiency can be improved.

As described above, Sample 8 and Samples 5 to 7 have different densities. That is, it is found that the tangible component contained in each of the sample solutions 30 can be recovered at a stable recovery rate by setting the first frequency, the second frequency, and the third frequency for the sample solutions 30 having various densities.

(Experiment 4)

As Experiment 4, the center frequency of the ultrasonic wave was 332 kHz which was the same as the first frequency, the reciprocal of the focusing time was measured when the sweep width of the frequency of the ultrasonic wave was set from 0 kHz to 8 kHz, and the reciprocal of the focusing time of each sweep width was compared.

In Experiment 4, the frequency of the ultrasonic wave was changed by sweep in a sawtooth wave shape as shown in FIG. 7. The sweep cycle was 100 milliseconds.

The measurement method was equivalent to the conditions described in Experiment 3.

Figure 11:
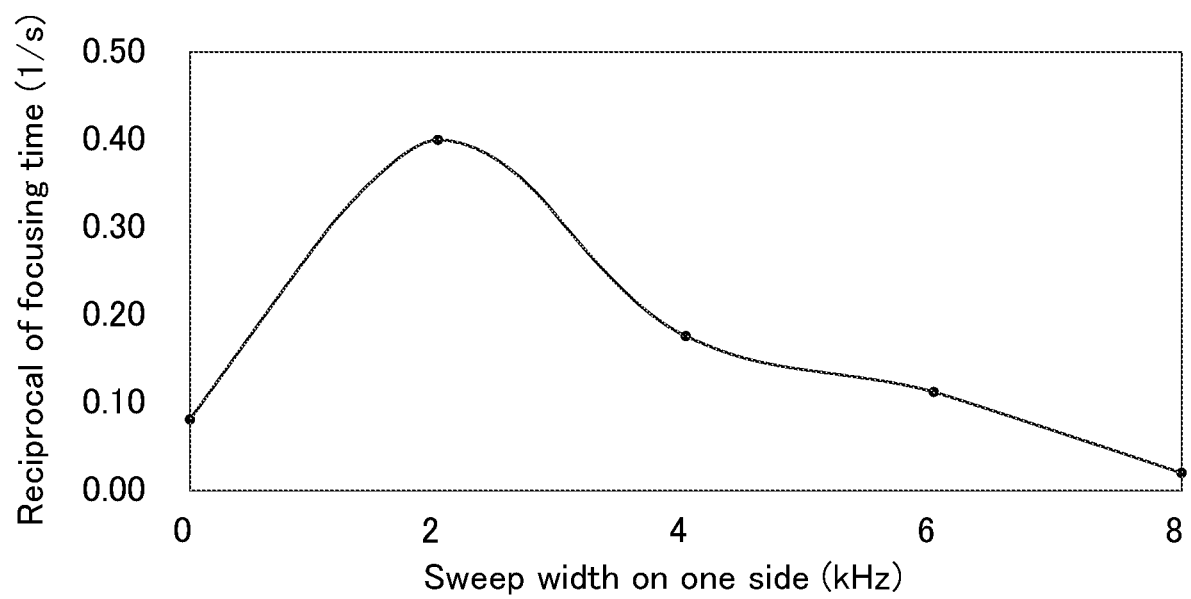
FIG. 11 is a graph showing the change in reciprocal of the focusing time due to a difference in sweep width using the particle recovery device according to an exemplary embodiment of the present disclosure.

FIG. 11 is a view showing results obtained by the above-described experimental method. From FIG. 11, it can be seen that the reciprocal of the focusing time indicated by the condition with the sweep width of 2 kHz or more and 6 kHz or less, which sweeps above and below the frequency of 332 kHz at which the particles in the sample solution 30 can be most efficiently recovered, is larger than the reciprocal of the focusing time indicated by the condition without sweep (sweep width 0 kHz). That is, it can be seen that the focusing time can be shortened by sweeping 2 kHz or more and 6 kHz or less which are the values above and below 332 kHz as the first frequency.

On the other hand, under the condition of the sweep width of 8 kHz, the reciprocal of the focusing time is smaller than that under the condition without sweep (sweep width 0 kHz). Therefore, from the viewpoint of recovering the particles contained in liquid samples having various densities and the like well with a short focusing time, it is found that the sweep width on one side in this experiment is desirably within 6 kHz, that is, within 2% with respect to the first frequency.

The sweep width on one side is sufficiently small at 2.5% with respect to the first frequency. Since the frequency is changed within a range in which the sweep width of the frequency is small, the particles having been temporarily focused do not dissipate and remain in the focused position. As shown in the above-described expression (3), since n is not an integer value other than 1, the number of the nodes N of the generated standing wave SW is not a value other than 1 which is a predetermined number. Thus, it can be seen that the antinode AN of the standing wave SW that generates the node N other than 1 is not generated at the position of the node N (on the central axis), and dispersion of the tangible component temporally focused at the position of the node N can be prevented.

(Experiment 5)

Next, as Experiment 5, the reciprocal of the focusing time was compared in a case where the sweep cycle was changed while the sample solution 30 and the sweep width were the same.

In Experiment 5, the center frequency of the ultrasonic wave applying to Sample 8 of the sample solution 30 was set to 332 kHz which was the same as the first frequency, and the sweep width (the sweep width on the low frequency side and the sweep width on the high frequency side) on one side with respect to the center frequency was set to 2 kHz (the second frequency was 330 kHz, and the third frequency was 334 kHz). The focusing time was measured when the sweep cycle was 100 milliseconds and when the sweep cycle was 10 milliseconds.

The measurement method was equivalent to the conditions described in Experiment 3.

Figure 12:
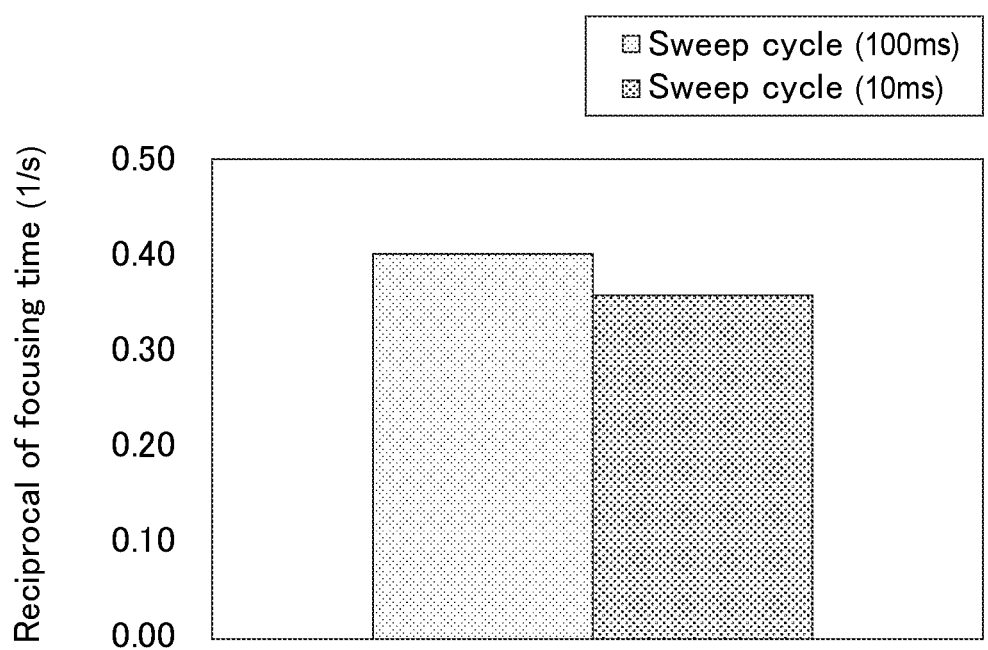
FIG. 12 is a graph showing the change in reciprocal of the focusing time due to a difference in sweep period using the particle recovery device according to an exemplary embodiment of the present disclosure.

FIG. 12 is a view showing results obtained by the above-described experimental method.

As shown in FIG. 12, there is no large difference in the reciprocal of the focusing time between the case where the sweep cycle is 100 milliseconds and the case where the sweep cycle is 10 milliseconds. Therefore, it can be seen that the sweep cycle in this experiment is not limited as long as it is 100 milliseconds or less.

In the above Examples, the ultrasonic wave is applied in the state where the flow path 50 is filled with the sample. However, a similar result is shown even when the ultrasonic wave is applied in a state where the sample flows into the flow path 50.

Hereinabove, although the exemplary embodiments of the present disclosure have been described above with reference to the accompanying drawings, it is obvious that a person having ordinary knowledge in the technical field to which the present disclosure belongs can conceive of various modifications or applications within the scope of the technical idea described in the claims, and it is naturally understood that these also belong to the technical scope of the present disclosure.

INDUSTRIAL APPLICABILITY

The particle recovery device according to the present disclosure can be used, for example, in an analytical instrument for a liquid containing particles, and the particle recovery method according to the present disclosure can be used, for example, in an operation procedure of the analytical instrument for the liquid containing particles.

What is claimed is:

1. A particle recovery method of recovering particles contained in a urine sample, the particle recovery method comprising:
    applying, in a flow path, an ultrasonic wave that repeatedly sweeps between a second frequency lower than a first frequency that is a frequency of the ultrasonic wave that generates, in the flow path, a standing wave having a single node in the flow path through which the urine sample flows, the standing wave being generated in a direction orthogonal to a flow direction of the flow path when an averaged sample solution, obtained by mixing multiple urine samples with different densities, is caused to flow through the flow path, and a third frequency that is a frequency higher than the first frequency; and
    recovering the particles focused in the flow path by the standing wave.

2. The particle recovery method according to claim 1, wherein:
    the second frequency is a frequency that is equal to or greater than 97.5% of the frequency of the first frequency, and
    the third frequency is a frequency that is equal to or less than 102.5% of the frequency of the first frequency.

3. The particle recovery method according to claim 1, wherein the standing wave is generated in a state in which the urine sample is pressurized inside the flow path.

4. The particle recovery method according to claim 1, wherein the particles are recovered in a double tube having an inner tube and an outer tube having a same axial center on a downstream side in the flow direction.

5. The particle recovery method according to claim 4, wherein the particles are recovered in the inner tube.

6. The particle recovery method according to claim 1, wherein the ultrasonic wave is generated by supplying an alternating-current to a piezoelectric element.

7. The particle recovery method according to claim 1, wherein the frequency of the alternating-current voltage supplied to the piezoelectric element is changed linearly.

8. The particle recovery method according to claim 1, wherein the frequency of the alternating-current voltage supplied to the piezoelectric element is changed stepwise.

* * * * *